(12) United States Patent
Skladman et al.

(10) Patent No.: US 6,400,810 B1
(45) Date of Patent: Jun. 4, 2002

(54) METHOD AND SYSTEM FOR SELECTIVE NOTIFICATION OF E-MAIL MESSAGES

(75) Inventors: Julia Skladman, Northbrook; Robert Joseph Thornberry, Jr., Wheaton, both of IL (US)

(73) Assignee: Ameritech Corporation, Hoffman Estates, IL (US)

( * ) Notice: Subject to any disclaimer, the term of this patent is extended or adjusted under 35 U.S.C. 154(b) by 0 days.

(21) Appl. No.: 09/357,794

(22) Filed: Jul. 20, 1999

(51) Int. Cl.[7] .............................................. H04M 11/00
(52) U.S. Cl. .................................... 379/93.24; 709/207
(58) Field of Search .......................... 379/90.01, 93.24, 379/93.23, 100.08, 88.13, 88.15, 88.12; 709/207, 206; 706/47, 45; 455/566; 707/9, 10, 104

(56) References Cited

U.S. PATENT DOCUMENTS

| | | |
|---|---|---|
| 4,266,098 A | 5/1981 | Novak |
| 4,646,346 A | 2/1987 | Emerson et al. |
| 4,853,952 A | 8/1989 | Jachman et al. |
| 5,329,578 A | 7/1994 | Brennan et al. |
| 5,333,266 A | 7/1994 | Boaz et al. |
| 5,377,191 A | 12/1994 | Farrell et al. |
| 5,377,354 A | 12/1994 | Scannell et al. |
| 5,406,557 A | 4/1995 | Baudoin |
| 5,530,844 A | 6/1996 | Phillips et al. |
| 5,555,346 A * | 9/1996 | Gross et al. ................... 706/45 |
| 5,557,515 A | 9/1996 | Abbruzzese et al. |
| 5,561,703 A * | 10/1996 | Arledge et al. .............. 455/566 |
| 5,572,576 A | 11/1996 | Klausnor et al. |
| 5,577,202 A | 11/1996 | Padgett |
| 5,608,786 A | 3/1997 | Gordon |
| 5,623,537 A | 4/1997 | Ensor et al. |
| 5,633,916 A | 5/1997 | Goldhagen et al. |
| 5,634,100 A | 5/1997 | Capps |
| 5,651,054 A | 7/1997 | Dunn et al. |
| 5,675,507 A | 10/1997 | Bobo, II |
| 5,680,551 A | 10/1997 | Martino, II |
| 5,689,642 A | 11/1997 | Harkins et al. |
| 5,706,334 A | 1/1998 | Balk et al. |
| 5,768,503 A | 6/1998 | Olkin |
| 5,796,394 A | 8/1998 | Wicks et al. |
| 5,796,806 A | 8/1998 | Birckbichler |
| 5,822,527 A * | 10/1998 | Post ........................... 709/206 |

(List continued on next page.)

OTHER PUBLICATIONS

"Ipnet Water frees admins", *PC Week*, Feb. 23, 1998 v15 n8 p105(2).

"EventCenter 1.0 gains speed", *InfoWorld*, Sep. 29, 1997 v19 n39 p72A(1).

"Coping with the deluge; effective management key when nonstop E–mail hampers productivity", *Computerworld*, May 17, 1993 v27 n20 p53(2).

"E–mail notification", *Computerworld*, Jun. 22, 1998 v32 n25 p41(1).

"Constellation approaches: Netscape's future Web client to deliver a universal interface", *Infoworld*, Mar. 3, 1997 v19 n9 p1(2).

*Primary Examiner*—Stella Woo
(74) *Attorney, Agent, or Firm*—Brinks Hofer Gilson & Lione

(57) ABSTRACT

A messaging system (10) for notifying subscribers of incoming e-mail messages includes an e-mail system (12) communicating with a notification system (14). The e-mail system (12) includes a user interface (22) that permits subscribers to populate filter lists (16) with e-mail message attributes, such as sender e-mail addresses. The filter list (16) is provided to the notification system (14), which selectively notifies subscribers of incoming e-mail messages based on the contents of their respective filter lists. The notification system (14) can alert subscribers to incoming e-mail messages by pager, facsimile, voice mail, synthetic speech via cellular or conventional telephones, or the like.

2 Claims, 5 Drawing Sheets

U.S. PATENT DOCUMENTS

| | | |
|---|---|---|
| 5,828,833 A | 10/1998 | Belville et al |
| 5,841,850 A | 11/1998 | Fan |
| 5,857,201 A | 1/1999 | Wright, Jr. et al. |
| 5,870,605 A | 2/1999 | Bracho et al. |
| 5,884,033 A | 3/1999 | Duvall et al. |
| 5,905,777 A * | 5/1999 | Foladare et al. ......... 379/93.24 |
| 5,937,161 A * | 8/1999 | Mulligan et al. ........ 379/93.24 |
| 5,982,856 A * | 11/1999 | Cohn et al. ............... 379/88.14 |
| 5,995,597 A * | 11/1999 | Woltz et al. ............. 379/93.24 |
| 6,023,700 A * | 2/2000 | Owens et al. ................. 707/10 |
| 6,092,101 A * | 7/2000 | Birrell et al. ............ 379/93.24 |
| 6,118,856 A * | 9/2000 | Paarsmarkt et al. ..... 379/93.24 |

\* cited by examiner

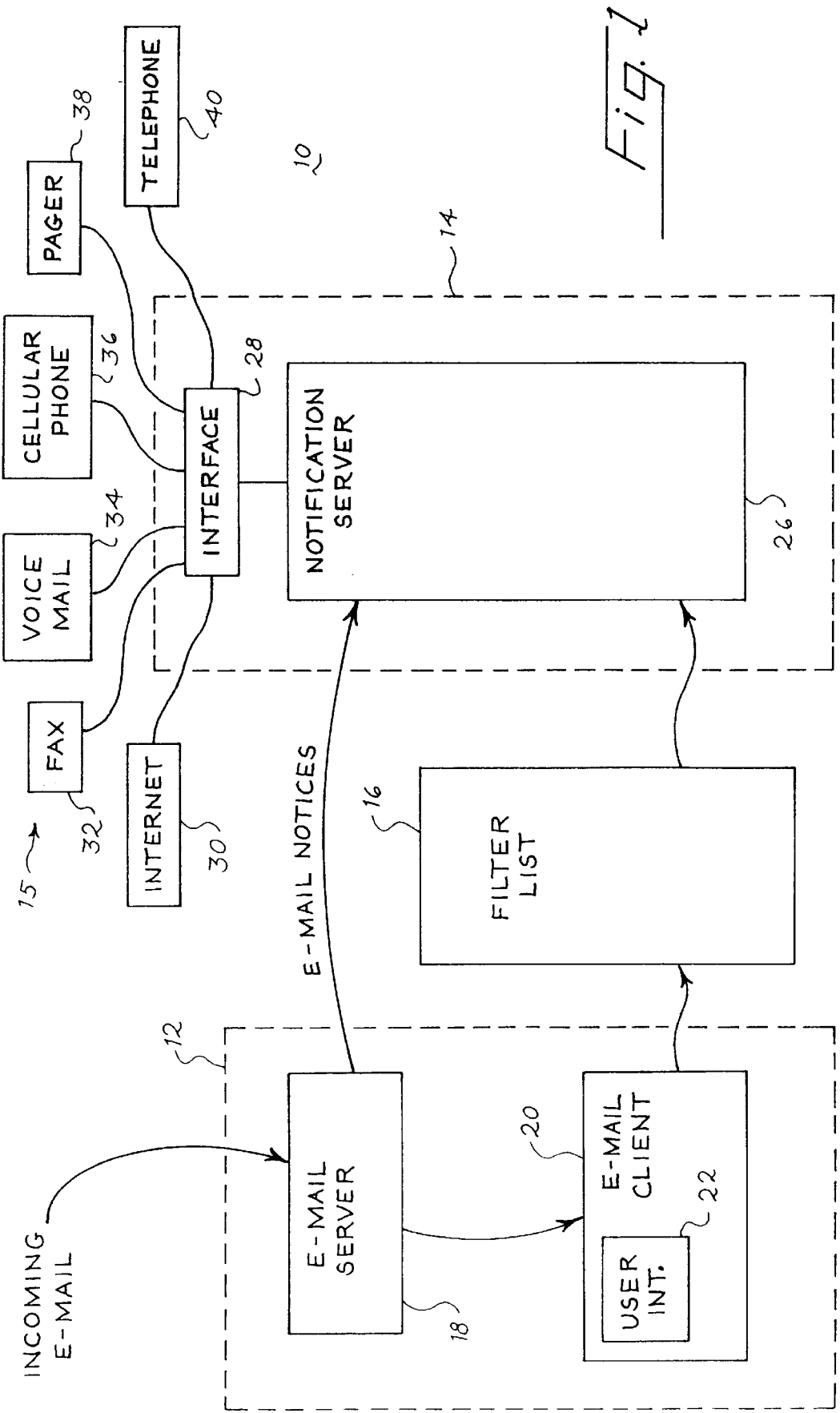

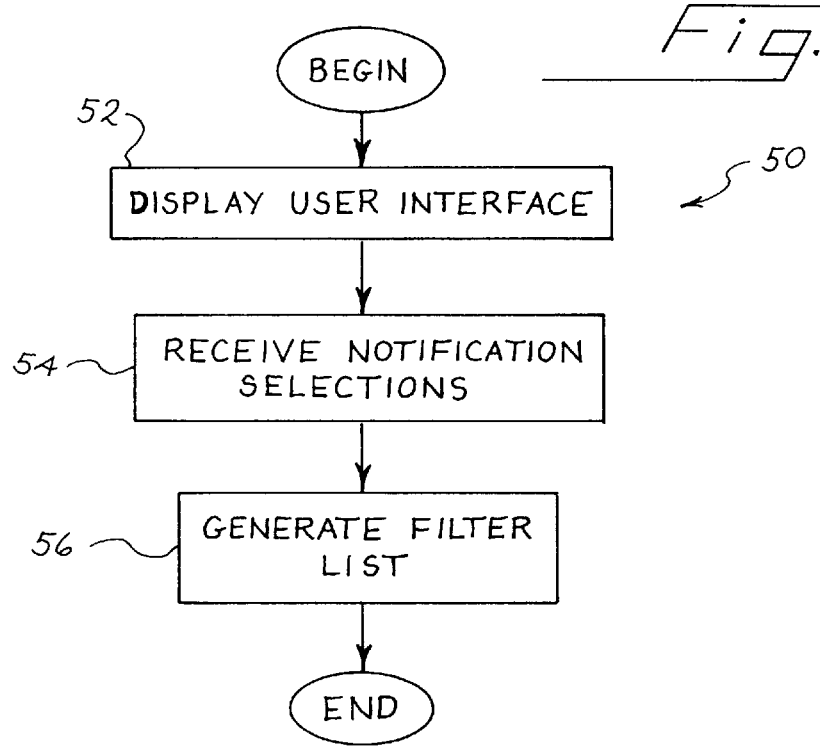
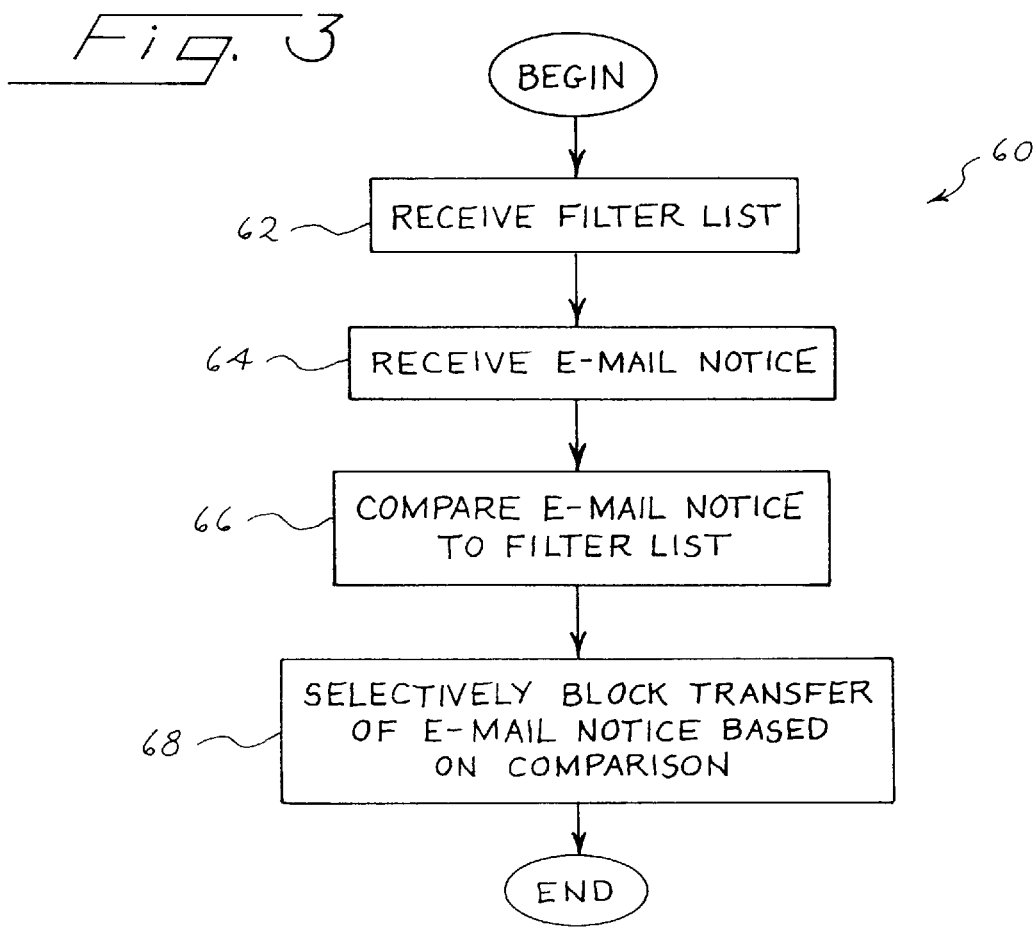

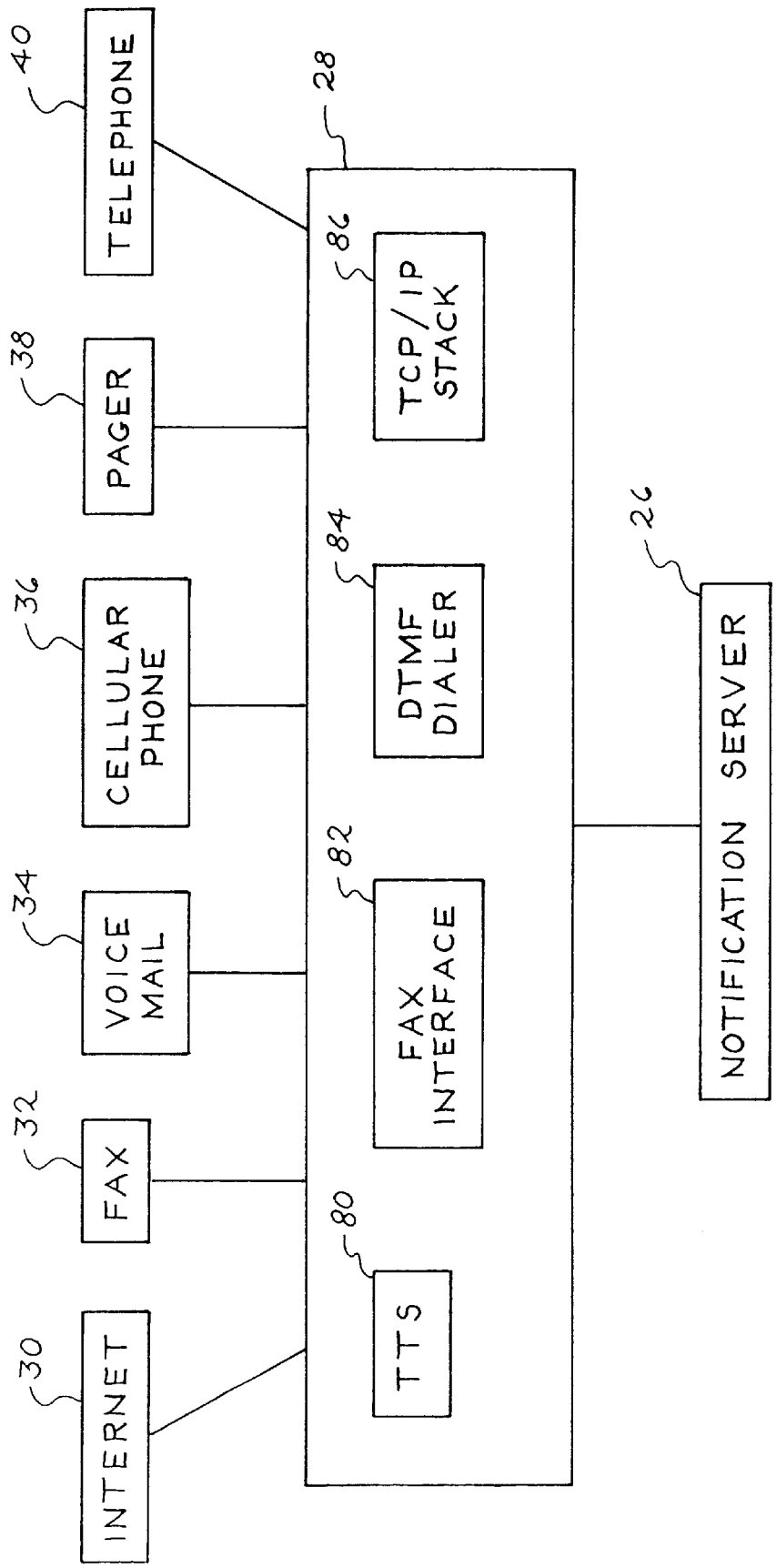

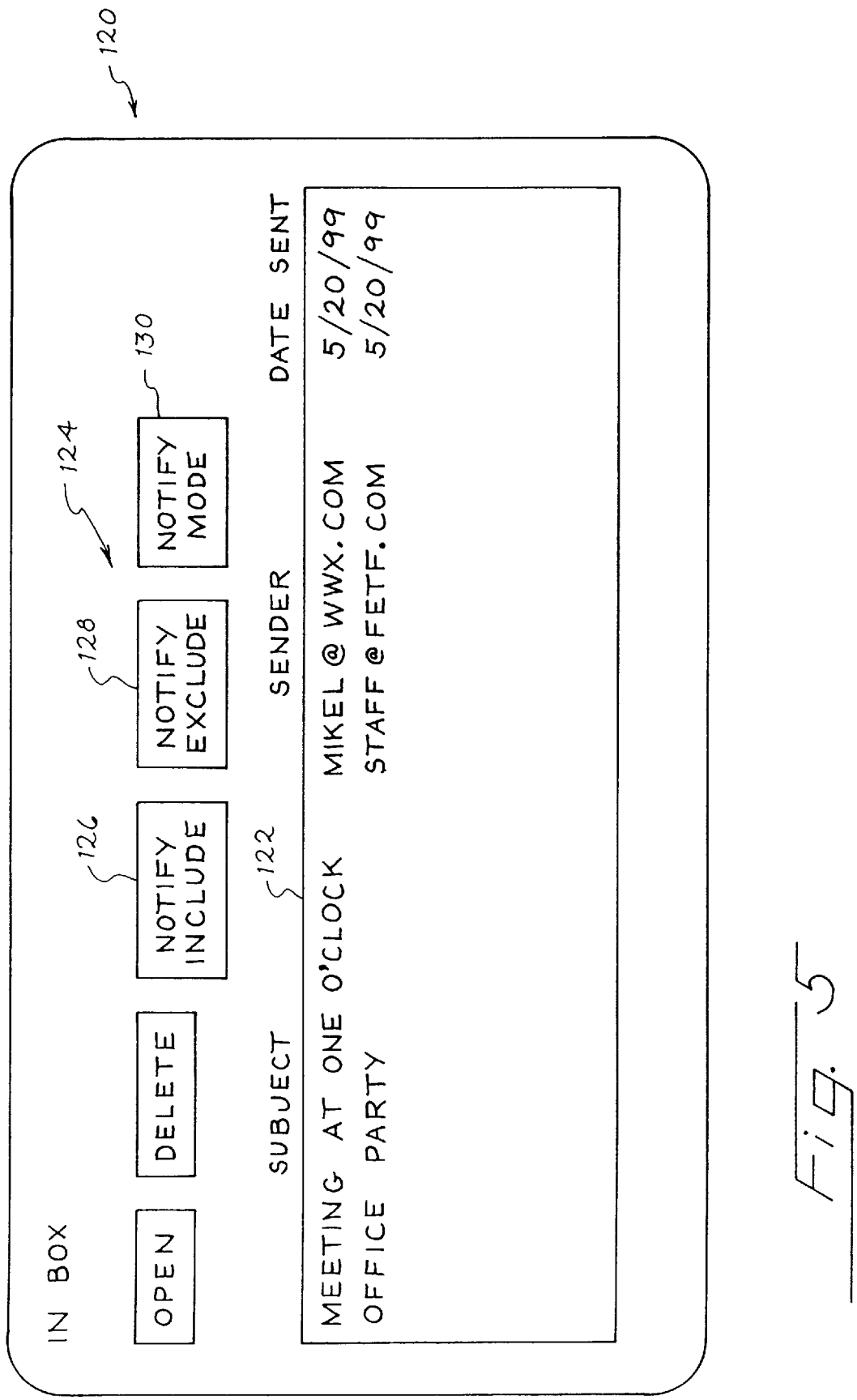

METHOD AND SYSTEM FOR SELECTIVE NOTIFICATION OF E-MAIL MESSAGES

TECHNICAL FIELD OF THE INVENTION

The present invention relates generally to messaging systems, and in particular, to a messaging system and method that selectively notifies users of received e-mail messages by way of one or more communication channels.

BACKGROUND OF THE INVENTION

Electronic mail (e-mail) systems are well known. In such systems, computers are interconnected by a network which allows users at each computer to send messages to each other.

In conventional e-mail systems, users must directly access their e-mail accounts to retrieve e-mail messages, or to determine if any new messages have been received. This typically requires users to log onto computers serviced by the e-mail system. This arrangement is inconvenient for mobile users who are often without access to computers connected to the e-mail service. Further, with conventional e-mail, users are not notified of messages until they actually log into the e-mail system. This latter disadvantage frequently causes users who are away from their computers to miss urgent e-mail messages or receive them in an untimely manner.

To facilitate timely and convenient notification of incoming e-mail messages, an e-mail system can operate in conjunction with a notification system. A notification system is a computer-based communication system that can transfer messages to a subscriber, notifying him/her of particular events, such as the receipt of new e-mail messages. Typically, a notification system can be configured to transfer messages to a subscriber over one or more preselected communications channels. For example, known notification systems can transmit notification messages to subscribers via fax, voice mail, pagers, the Internet, cellular phones, conventional telephones, and the like. Such notification systems can be configured to deliver messages over any or all of the available communication channels, depending on the preferences of respective subscribers.

When used in conjunction with an e-mail service, a notification service provides a messaging system that quickly and conveniently notifies subscribers of received e-mail messages without requiring the subscribers to remain at their computers. Upon receiving notification, subscribers can access the e-mail system at their discretion to review any new e-mail messages.

As is true with any communications system, subscribers receive messages of varying importance. In e-mail systems, subscribers frequently prefer to screen messages according to their importance. Unfortunately, current e-mail notification systems do not provide convenient subscriber interfaces for pre-setting notification priorities of incoming e-mail. Moreover, unsolicited e-mail messages, also known as "junk e-mail" and "SPAM" are becoming more common place. This can be problematic for notification service subscribers, who cannot easily configure the messaging service to block notification of unwanted e-mail messages. Accordingly, there is a need for an improved messaging system that permits subscribers to conveniently select notification priority for incoming e-mail messages.

BRIEF DESCRIPTION OF THE DRAWINGS

The accompanying drawings provide an understanding of the invention as described in an embodiment to illustrate the invention and to explain the principles of the invention.

FIG. 1 is a block diagram illustrating a messaging system in accordance with an exemplary embodiment of the present invention.

FIG. 2 shows a flowchart diagram illustrating the operation of the e-mail system of FIG. 1 in accordance with an embodiment of the invention.

FIG. 3 shows a flowchart diagram illustrating the operation of the notification system of FIG. 1 in accordance with an embodiment of the present invention.

FIG. 4 is a block diagram illustrating details of the notification system shown in FIG. 1.

FIG. 5 illustrates an example of an e-mail summary window displayable by the user interface shown in FIG. 1.

DETAILED DESCRIPTION

Figure 6:
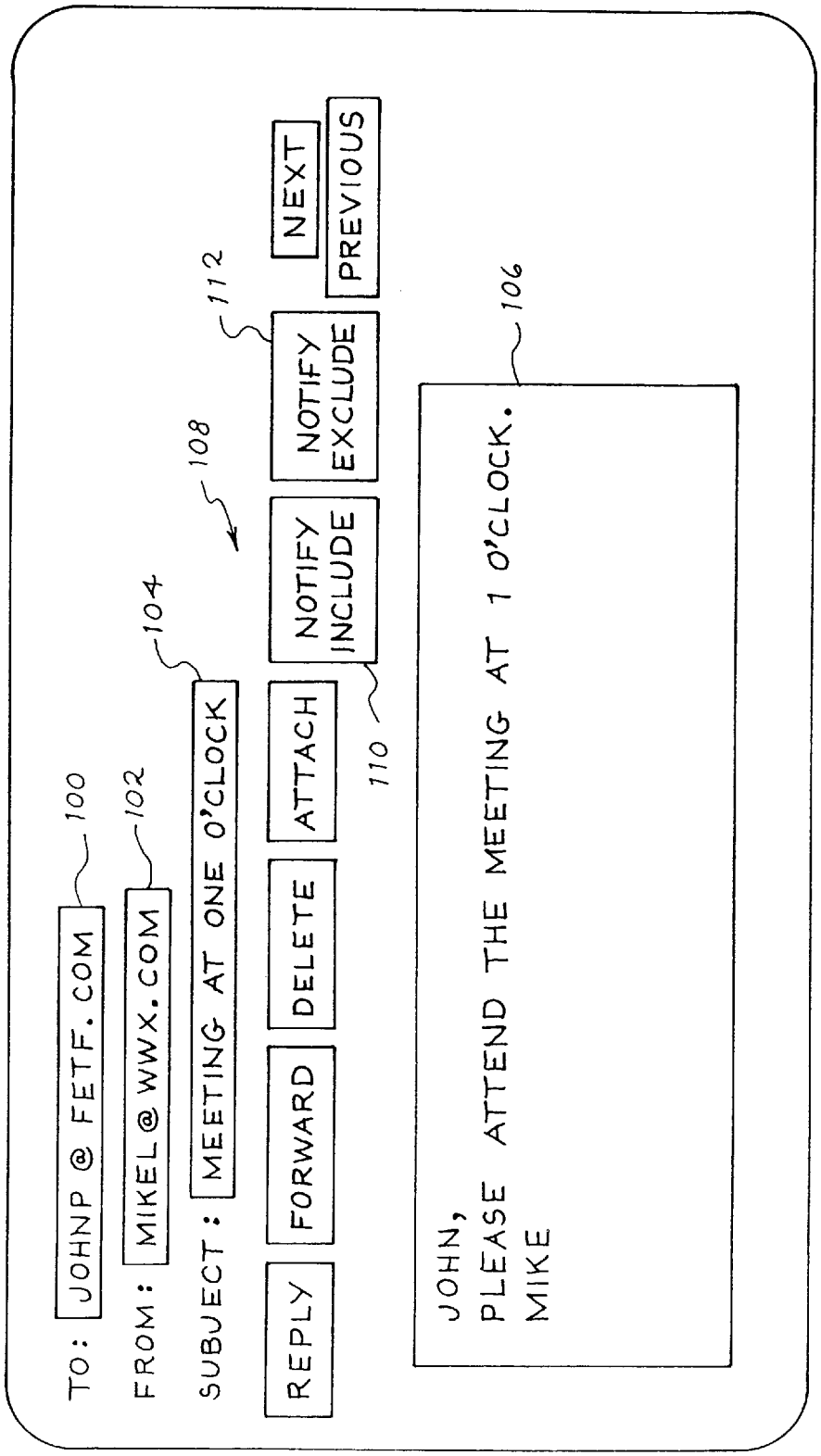
FIG. 6 illustrates an exemplary e-mail message display window displayable by the user interface shown in FIG. 1.

It will be understood that the following detailed description is exemplary and intended to provide further explanation of the invention as claimed.

The present invention relates to an improved communication system for providing a messaging system capable of delivering notification messages to subscribers by way of one or more preselected communication channels. The messaging system includes, among other things, an e-mail system having a convenient user interface that permits subscribers to create filter lists containing predetermined e-mail message attributes, such as sender e-mail addresses. The filter lists can establish notification priorities for incoming e-mail messages. A notification system, operating in conjunction with the e-mail system, can deliver e-mail notices to subscribers, according to subscriber-selected priority schemes contained in the filter lists.

This arrangement is advantageous in that it allows subscribers to conveniently set the delivery priority of e-mail notices. For instance, for e-mail messages of importance, subscribers can configure the filter list so that the notification system alerts them as quickly as possible of new e-mail. Alternatively, for unimportant e-mail, subscribers can configure the filter list to act as a blocking mechanism for preventing notice of unwanted e-mail messages.

Turning now to the drawings, and in particular to FIG. 1, there is illustrated an example of a messaging system 10 in accordance with an embodiment of the present invention. The message system 10 includes an e-mail system 12 in communication with a notification system 14. The e-mail system 12 transfers e-mail notices to the notification system 14, which in turn, broadcasts the e-mail notices to respective subscribers via preselected ones of a plurality of communication channels 15. The e-mail system 12 also generates a filter list 16, which can be used by the notification system 14 to determine broadcast priority of an e-mail notice.

The e-mail notices can be computer-readable data tokens or files that are generated in response to incoming e-mail messages received by the e-mail system 12. An e-mail notice can include information sufficient to identify a corresponding incoming e-mail message. Such information can include attributes typically associated with e-mail messages, such as the e-mail addresses of the sender and recipient, the time and date when the e-mail message was received, the subject header of the message, or the like. Data files representing e-mail notices can be in any data format usable by both the e-mail system 12 and notification system 14, such as ASCII text.

The filter list 16 can be a computer-readable data file containing ASCII text representing e-mail message attributes which are usable by the notification system 14 to identify specific e-mail notices. The attributes stored in filter list 16 can include any of those listed above, but are typically limited to e-mail sender addresses and subject headers. Each e-mail attribute in the filter list 16 is associated with a subscriber-configurable priority flag, which can be a software variable representing a predetermined notification priority level. A user interface 22 in the e-mail system 12 permits a subscriber to select e-mail message attributes and their corresponding priority flags, and then store them in the filter list 16. By this arrangement, subscribers can conveniently set e-mail notification priorities while accessing their e-mail accounts or when reading e-mail messages.

Although the present invention is not limited to any particular software or computer architecture, the exemplary messaging system 10 shows the e-mail and notification systems 12–14 implemented using an exemplary client-server architecture. In this arrangement, an e-mail client 20 communicates with an e-mail server 18. A notification server 26 communicates with the e-mail server 18. An interface 28 is also included in the notification system 14, permitting the notification server 26 to communicate with subscribers over the communication channels 15.

The e-mail client 20 includes the user interface 22, which can be a graphical user interface (GUI) displayable by a conventional personal computer. The e-mail system 12 can include e-mail services and features associated with conventional e-mail, such as a standard interface for receiving and transferring e-mail messages over a computer network, a database for storing e-mail messages, and user interfaces, such as GUIs, for displaying and composing e-mail messages.

In addition to the conventional features associated with e-mail, the e-mail system 12 is adapted to generate the filter list 16 and e-mail notices in accordance with an embodiment of the present invention. An e-mail notice is generated by the e-mail system to indicate the arrival of a new e-mail message. E-mail notices originate at the e mail server 18 and can then be passed to the notification server 26. To facilitate timely delivery of the e-mail notices, the notification server 26 can be configured to poll the e-mail server 18 at predetermined intervals to check for new e-mail. Also, the e-mail notices can be sent to the e-mail client 20 when the user logs onto the e-mail. The e-mail server 18 can make any necessary format changes to the e-mail notices to place them in a form suitable for use by the notification system 14.

As will be discussed in greater detail below, the user interface 22 permits a subscriber to create and update the filter list 16. The user interface 22 can include a software program executing on a personal computer which generates a menu-driven computer interface that permits subscribers to select e-mail message attributes and set corresponding notification priority flags to be applied to future messages received by the e-mail server 18. The interface 22 can automatically store these attributes and flags in the filter list 16.

The e-mail client 20 can output the filter list 16 so that it is readily accessible by the notification server 26 without further intervention from a subscriber or system administrator.

The e-mail system 12 can be constructed from commercially-available e-mail software, modified in accordance with an embodiment of the invention. For example, the e-mail system 14 as described herein can be implemented using one or more conventional personal computers communicating over a conventional computer network and running Lotus Notes e-mail software, which has been modified using the LotusScript application programming environment, available from Lotus Development Corporation of Cambridge, Mass. Using LotusScript, the user interface 22 can be programmed as a GUI included in the Lotus Notes e-mail client.

The notification system 14 can be implemented using one or more commercially-available personal computers communicating over a conventional network and configured with application software to function in accordance with an embodiment of the present invention.

The e-mail client 20 can be an application client software program residing on a PC running a standard operating system, such as Windows from Microsoft Corp. The servers 18, 26 can be server software programs residing on conventional servers communicating with the client PCs using a standard computer network, such as an Ethernet local area network (LAN) or the Internet.

The notification system 14 can include software programs or servers (not shown) permitting the integration of voice mail, fax, e-mail and other messaging system into the system 10. In this arrangement, the system 10 acts as a unified messaging/notification system in which subscribers can be notified in incoming messages arriving over voice mail, fax, e-mail, and the like. An integrated notification service, such as J-FAX, from J-FAX, Inc. can be used to support the unified notification system. Such services permit the e-mail system 12 to includes legacy e-mail systems, which can be pre-existing e-mail systems used by subscribers prior to integrating the e-mail system 12 and notification system 14 in accordance with an embodiment of the invention. In addition, legacy voice-mail messaging systems can be likewise integrated.

FIG. 2 illustrates a flowchart diagram of a method of operating the e-mail system 12 in the set-up mode in accordance with an embodiment of the present invention. In step 52, the user interface 22 is displayed by the e-mail client 20. The user interface 22 can be a GUI permitting the subscriber to select functions by pointing and clicking with a computer mouse. As stated earlier, the GUI can be implemented by configuring a Lotus Notes e-mail client using LotusScript, according to an embodiment of the invention. Next, in step 54, the notification selections made by the subscriber are received by the e-mail client 20 via the user interface 22. The notification selections identify e-mail attributes and their corresponding flags for determining the priority with which incoming e-mail messages are to be notified to the subscriber. In step 56, the filter list 16 containing the notification selections is generated by the e-mail client 20. The filter list 16 is then provided to the notification system 14. The filter list 16 can be provided directly to a notification server 26, or alternatively, the list 16 can be stored on the e-mail server 18 and the notification server 26 can actively poll the e-mail server 26 at predetermined intervals to receive the filter list 16.

In addition, the filter list 16 can include two separate lists: an enable list and a blocking list (not shown). These two lists support two operational modes of the system 10: an "include" mode and an "exclude" mode. In the include mode, the system 10 only notifies a subscriber of an incoming e-mail if attributes of the e-mail message are present in the include list. Thus, in this mode, the system 10 blocks notification of all e-mail messages, except those defined by the include list.

In the exclude mode, a subscriber is notified of all incoming e-mail messages, except those identified by the exclude list. This mode permits a user to specifically block e-mail from particular sources or regarding particular subjects. The user interface for selecting a mode of operation is further described below in connection with FIG. 5.

FIG. 3 shows a flowchart diagram illustrating a method 60 of operating the notification system 14 in accordance with an embodiment of the present invention. In step 62, the filter list 16 is received by the notification server 26. The notification server can store the filter list 16 for later comparison with e-mail notices. Next, in step 64 an e-mail notice is received from the e-mail server 18. The e-mail notice indicates that a new e-mail message has been received by the e-mail server 18. The e-mail notice can be sent directly to the notification server 26 using an internet protocol (IP), or alternatively the notification server can include a proxy server that essentially emulates the e-mail client 20 and logs into the e-mail server 18 to retrieve the e-mail notices. With a proxy server, the notification system 14 can be configured to regularly activate the proxy server at predetermined intervals to check for new e-mail notices. Upon receiving the e-mail notice, the notification server 26 compares the e-mail notice to the e-mail attributes in the filter list 16 (step 66). Based on the comparison between the e-mail notice and the filter list 16, the notification server 26 can either transfer the e-mail notice to the interface 28 or block its transfer (step 68).

To make this comparison, the notification server 26 compares the attributes contained in the e-mail notice to those stored in the filter list 16. The notification server 26 then checks any priority flags in the filter list 16 corresponding to the e-mail notice attributes, and accordingly, either blocks or forwards the notice to the interface 28. The priority flags can include an "include flag" and an "exclude flag". An include flag indicates that the e-mail notice should be forwarded to the subscriber, while an exclude flag indicates that the e-mail notice should be blocked. Accordingly, if an attribute in the e-mail notice corresponds to an exclude flag, the notification server 26 blocks the e-mail notice, not passing it to interface 28. Alternatively, if an e-mail notice attribute corresponds to an include flag, the notification server 26 forwards the e-mail notice to the interface 28, which, in turn, causes the notice to be transferred to the subscriber via one or more of the communication channels 15.

The server 26 can include a software program executing on a conventional server including a standard operating system, such as Windows NT. In such an arrangement, the server 26 monitors a standard network interface (not shown) included in the PC for incoming e-mail notices from the e-mail server 18. When a notice is received, the server 26 determines the corresponding subscriber by checking the subscriber's e-mail address, which is included as one of the notice attributes. The server 26 can include a plurality of subscriber profiles, which are computer-usable data files that can indicate which communication channels are to be used for transferring e-mail notices to respective subscribers. Based on the subscriber selections contained in the profile corresponding to the received e-mail notice, the server 26 can transfer the e-mail notice to the corresponding interface components 80–86 using APIs available with the operating system. The server 26 can perform any additional formatting required to communicate notices to the interface components 80–86. The notification server can include commercially available software for providing notification services, such as that available from Notify Technologies Corp. of San Jose, Calif.

In response to e-mail notices from the server 26, the interface 28 transfers the notices over preselected ones of the communication channels 15 using standard protocols.

The profiles in the notification server 26 can be individually configured to transfer notices over communication channels selected by the subscribers. For example, if a subscriber prefers to be notified by phone during the day and pager during the evening, the notification server 26 can be programmed accordingly to deliver e-mail notices to a phone and pager.

FIG. 4 illustrates a detailed block diagram of the notification system 14. The interface 28 includes a text-to-synthesizer (TTS) 80, a conventional facsimile (fax) interface 82, a conventional dual-tone multi-frequency (DTMF) dialer 84, and a conventional TCP/IP interface 86. These interface components permit the notification server 26 to communicate with each of the various communication channels 15. Each interface component can be implemented using commercially-available PC peripheral devices configured to communicate with the server 26 using standard APIs in Windows.

In particular, the TTS 80 generates spoken messages in response to computer readable text messages received form the notification server 26. The synthesized speech can be used to audibly notify a subscriber by way of the voice mail 34, cellular phone 36, or the conventional telephone 40. The TTS 80 can be implemented using standard components, such as TruVoice from Centigram Communications Corp. of San Jose, Calif. or DECtalk from Digital Equipment Corp. of Massachusetts. The fax interface 82 can be a conventional personal computer fax card, such as a FAX/Modem PC Card from Boca Research, Inc. of Boca Raton, Fla. The fax interface 82 can permit the notification server 26 to transfer e-mail notices to subscribers by way of the fax 32. The DTMF dialer 84 can be a conventional telephony interface for use with standard personal computers, such as the Alcatel 4961 TAPI Middleware from Alcatel of Paris, France. The DTMF dialer 84 can be used to connect to each of the communications channels that rely on a conventional dial-up telecommunications network.

The TCP/IP stack 86 can be a commercially-available software program running on a standard PC operating system, such as Window NT. The stack 86 permits the notification server 26 to communicate an e-mail notice to the subscriber over data networks using the TCP/IP protocol, such as the Internet 30.

FIG. 5 illustrates an exemplary GUI that can be included in the user interface 22 of the e-mail client 20. A message summary window 120 can be used to display summary information of received e-mail messages in the summary display portion 122. In the example shown, two e-mail messages have been received and are unread. The summary window 120 also includes a tool bar 124 having one or more software buttons. Included in the tool bar 124 is a notification include button 126, a notification exclude button 128, and a notification mode button 130. A subscriber can select an e-mail message in the summary window 122 and then click on the notify include button 126 to set an e-mail attribute and corresponding priority flag in the filter list 16, which can cause the notification system 14 to notify the subscriber of any future e-mail messages received from the sender or having the same subject of the selected e-mail message. By clicking the notify exclude button 128, the subscriber can set an e-mail attribute and priority flag in the filter list 16 which can cause the notification system 14 to block notification of any future e-mail received by the sender or having the same subject of the selected e-mail message.

The notify mode button 130 permits the subscriber to select either the exclude mode of operation or the include mode of operation, the details of which were discussed above in connection with FIG. 2. If the exclude mode is selected, the notify include button 126 can be deactivated; and conversely, if the include mode is selected, the notify exclude button 128 can be deactivated. Further, when the exclude mode is selected, the contents of the filter list can define e-mail messages to be blocked by the notification system. Conversely, when the include mode is selected, the contents of the filter list can exclusively define those e-mail messages that will be notified to the subscriber.

FIG. 6 illustrates an exemplary message display window 90 that can be included in the user interface 22. The message display window 90 includes a receiver e-mail address field 100, a sender e-mail address field 102, a subject header field 104 and a display portion 106 for displaying the contents of a received e-mail-mail message. The window 90 also includes a tool bar 108 which can include conventional software buttons for conventional e-mail functions, as well as a notify include button 110 and a notify exclude button 112.

The functions of the software buttons 110, 112 are essentially the same as those buttons 126, 128 described above for the message summary window 120. By clicking the notify include button 110, a subscriber can configure the filter list 16 so that the notification system 14 transfers e-mail notices for any future messages received by the sender or regarding the subject of the e-mail message currently displayed in the display portion 120. Alternatively, any future e-mail messages from the sender or regarding the indicated subject of the displayed message can be blocked from notification by clicking the notify exclude button 112.

It should be appreciated that a wide range of changes and modifications may be made to the embodiment of the invention as described herein. Thus, it is intended that the foregoing detailed description be regarded as illustrative rather than limiting and that the following claims, including all equivalents, are intended to define the scope of the invention.

What is claimed is:

1. A communication system, comprising:

an e-mail system capable of presenting a user interface window displaying summary information regarding a received e-mail message or content of the received e-mail message;

a notification include button, included in the user interface window, for allowing a user to set a priority flag while viewing the summary information or the content of the received e-mail message, wherein activation of the notification include button sets the priority flag to permit notification of one or more future incoming e-mail messages associated with the received e-mail message;

a notification exclude button, included in the user interface window, for allowing the user to set the priority flag while viewing the summary information or the content of the received c-mail message, wherein activation of the notification exclude button sets the priority flag to block notification of the future incoming e-mail messages associated with the received e-mail message;

a filter list for storing the priority flag as set by the user; and a notification system, in communication with the e-mail system, for selectively notifying the user of the future incoming e-mail messages as a function of the priority flag stored in the filter list.

2. The communication system of claim 1, further comprising:

a notify mode button, included in the user interface window, for permitting the user to select an include mode of operation or an exclude mode of operation.

* * * * *